United States Patent [19]
Assadian

[11] Patent Number: 6,111,847
[45] Date of Patent: Aug. 29, 2000

[54] PICKER DEVICE AND METHOD FOR HANDLING PLANAR OBJECTS HAVING AN APERTURE THEREIN

[76] Inventor: Hamid R. Assadian, 15 Almeria, Irvine, Calif. 92614

[21] Appl. No.: 09/008,679

[22] Filed: Jan. 16, 1998

[51] Int. Cl.[7] .............................. G11B 17/04; B66C 1/00; B25J 15/10
[52] U.S. Cl. ......................... 369/178; 294/97; 414/796.9
[58] Field of Search .................. 369/36, 178; 414/796.6, 414/796.9; 294/93, 94, 99.1

[56] References Cited

U.S. PATENT DOCUMENTS

| | | | |
|---|---|---|---|
| 5,195,794 | 3/1993 | Hummel, Jr. et al. | 294/94 |
| 5,421,630 | 6/1995 | Sergi et al. | 294/93 |
| 5,503,446 | 4/1996 | De Jong | 294/94 |
| 5,692,878 | 12/1997 | Freund | 414/796.6 |
| 5,718,559 | 2/1998 | Freund | 414/797 |
| 5,873,692 | 2/1999 | Costas | 414/796.9 |
| 5,934,865 | 8/1999 | Meadows | 414/796.9 |
| 5,946,216 | 8/1999 | Hollerich | 364/478.11 |

*Primary Examiner*—Brian E. Miller
*Assistant Examiner*—Kenneth W Fields
*Attorney, Agent, or Firm*—Roy A. Ekstrand

[57] ABSTRACT

A picker device for engaging the topmost one of a stacked plurality of media having center apertures formed therein includes a resilient spring slidably supported within a support base at its upper edges. A spreader mechanism is supported between the resilient spring to selectively broaden or narrow the spring. The picker is operative by inserting the spring downwardly into the center apertures of the stacked disk media in its narrowed configuration and thereafter expanding the spreader device to force the legs of the V-shaped spring against the interior edge of the topmost disk element of the stacked array.

21 Claims, 4 Drawing Sheets

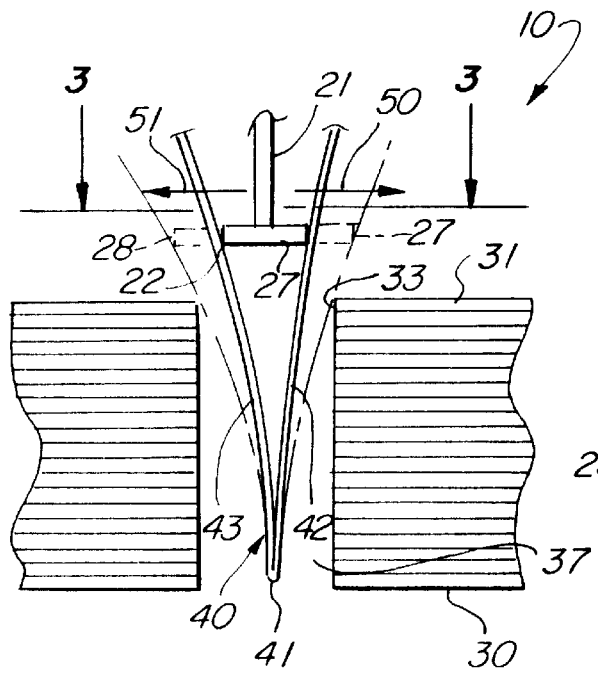
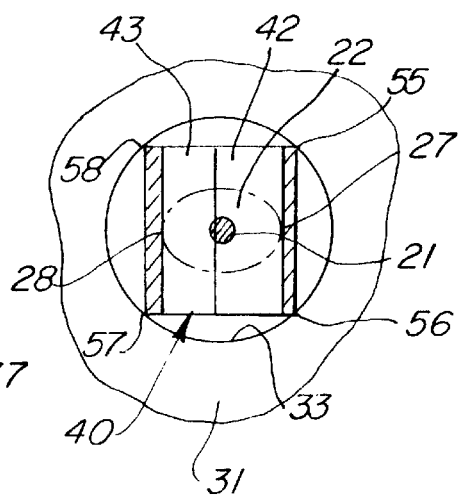
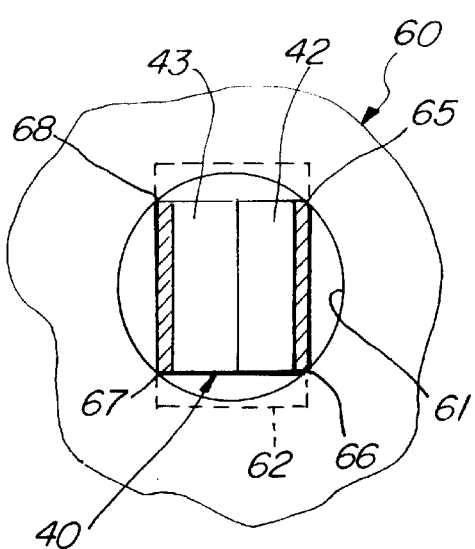

PICKER DEVICE AND METHOD FOR HANDLING PLANAR OBJECTS HAVING AN APERTURE THEREIN

FIELD OF THE INVENTION

This invention relates generally to apparatus for picking or selecting a single planar object from a plurality of similar objects arrayed in a stack and for handling moving or transporting such objects.

BACKGROUND OF THE INVENTION

A large number of generally planar objects such as compact disks, floppy disks, optical cartridges, and semiconductor wafers are manufactured and handled using processes which require lifting a single one of such objects from a plurality in a vertical stack. Such objects are selected or picked in preparation for moving or transporting the object during the manufacturing or other operational processes. In addition, users of such objects may employ similar picking or selecting devices in handling and moving objects during use and/or storage. In many instances, the processes involved are repetitive as, for example, is found in transferring a plurality of objects from a stack to one or more alternate positions or locations.

One of the most common types of planar objects of the type to which the present invention pertains is found in the various data storage media for computer systems. For example, the well known and pervasive compact disk which has found great use in data storage for computer, video and audio systems provides a medium which is generally planar and circular and which defines a center hole. In most compact disk media use, a plurality of laser embossed circular tracks are provided on the underside of the compact disk to store data. Other similar devices such as the well known floppy disk which provides magnetic media as well as optical cartridges which provide optically encoded data are similar in that they are generally planar media defining a center hole.

In virtually all processes involving such planar objects, handling by humans, even utilizing precautionary gloves and garments etc., is potentially damaging to such objects and is, for the most part, far too expensive with respect to labor costs. As a result, manufacturers and users of such planar devices employ machine handlers which mechanically grasp and handle such objects. Handling machines require a device or mechanism for attachment to the object. Such attachment or grasping devices are often referred to in the art as "pickers" due to their function of grasping or "picking" a single object from a plurality or stack of objects. For the most part, these picker devices are vacuum or suction-operated making use of the top surface portion of the media objects for attachment. Thus, in a typical vacuum or suction operated picker unit, a plurality of flexible soft suction cups are coupled to a vacuum source and a valving body operative under appropriate control for applying partial vacuum to the suction cups during the picking operation. A transport mechanism usually mechanical in operation is provided to move the picker unit between the location of the stack and the alternate location to which the media devices or objects are to be transported. While vacuum or suction-operated pickers form the major part of such devices in use, practitioners in the art have attempted to employ other mechanical attachments which utilize the outer edges of the planar objects for mechanical grasping.

While the prior art picking devices such as those referred to above have provided some operational capability within the art, there remains nonetheless a continuing need in the art for a lower cost, simpler, more reliable and more effective picker device for use in attachment to planar objects such as compact disk or other media.

SUMMARY OF THE INVENTION

Accordingly, it is a general object of the present invention to provide an improved picker device for planar objects. It is a more particular object of the present invention to provide an improved picker device for planar objects which does not require attachment to either planar surface of the object and which is cost effective and reliable. It is a further object of the present invention to provide an improved picker device for planar objects which reliably selects the topmost one of a stack of planar objects utilizing the center hole of the object. It is a still more particular object of the present invention to provide an improved picker device for planar objects which accommodates a substantial range of center apertures within the planar objects.

In accordance with the present invention, there is provided a picker device for use in engaging the top disk of a stacked plurality of disks each defining a center aperture, the picker device comprising: a base; a generally V-shaped spring having upper ends slidably supported by the base and a pair of downwardly extending legs joined at a common bottom portion; and expansion means supported by the base for expanding or narrowing the generally V-shaped spring within the center apertures of a plurality of disks causing the V-shaped spring to engage the aperture of the top disk without engaging underlying disks.

The invention also embodies a method of engaging the top disk of a vertical stack of disks each having a center aperture, the method comprising the steps of: providing a vertical stack of disks; providing an expandable V-shaped spring; moving the spring to extend downwardly into at least some of the center apertures; expanding the V-shaped spring to broaden the spring and engage the center aperture of the top disk; and raising the V-shaped spring and top disk.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 2 sets forth a partial section view of the present invention picker device;

FIG. 3 sets forth a partial top section view of the present invention picker device;

FIG. 4 sets forth a partial top section view of the present invention picker device handling objects having noncircular center holes;

FIG. 5 sets forth a partial section view of an alternate embodiment of the present invention picker device;

DESCRIPTION OF THE PREFERRED EMBODIMENTS

Figure 1:
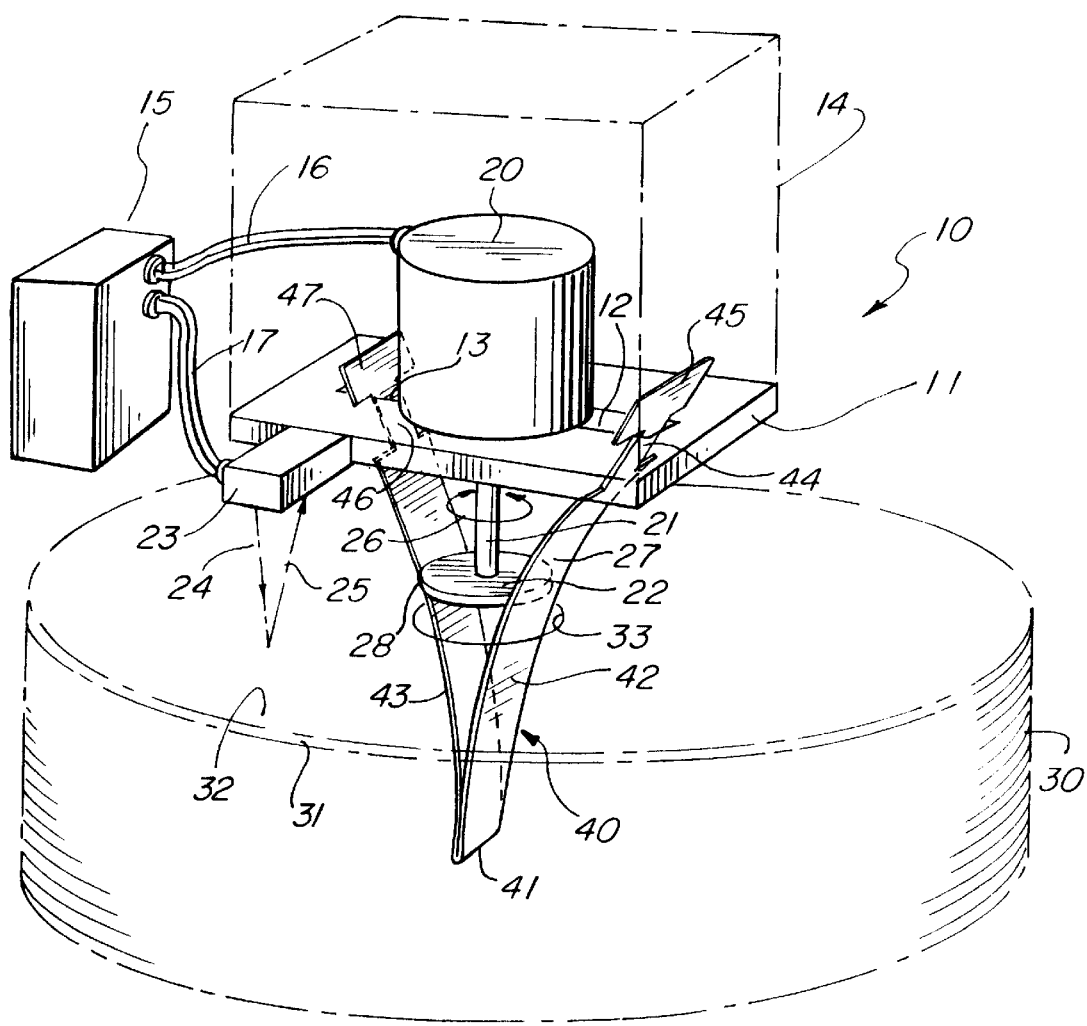
FIG. 1 sets forth a perspective view of a picker device constructed in accordance with the present invention.

FIG. 1 sets forth a perspective view of a picker device for planar objects constructed in accordance with the present invention and generally referenced by numeral 10. Picker 10 includes a base 11 supporting a housing 14 which is shown in dashed-line representation. Base 11 and housing 14 are fabricated of conventional materials such as metal or the like. Base 11 defines a pair of opposed slots 12 and 13 and further supports a conventional optical sensor 23. A controller 15 includes a microprocessor and stored instruction set for operation in accordance with conventional fabrication techniques and is coupled to optical sensor 23 by a plurality of connecting wires 17. Picker 10 further includes an elongated V-shaped spring 40 having a bottom edge 41 and a pair of generally planar elongated legs 42 and 43 extending upwardly therefrom. Legs 42 and 43 are formed of a resilient material such as spring steel or the like. Leg 42 defines a narrowed neck portion 44 passing through slot 12 and a tab 45 supported above slot 12. The cooperation of neck 44 extending through slot 12 and the extension of tab 45 cooperate to slidably support leg 42 of spring 40. Similarly, leg 43 defines a narrowed neck portion 46 passing through slot 13 together with an extending tab 47 at the upper end thereof. The extension of neck portion 46 through slot 13 and the increased size of tab 47 cooperate to slidably support leg 43 within slot 13 of base 11.

Figure 8:
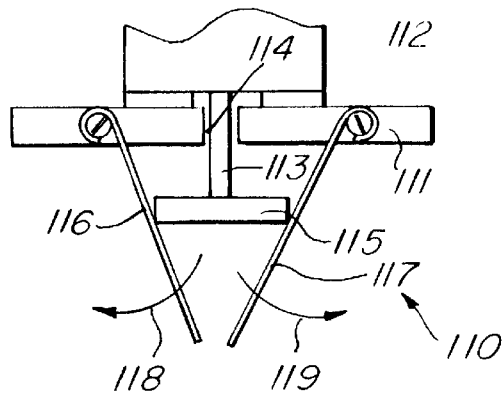
FIG. 8 sets forth a partial view of a still further alternate embodiment of the present invention picker device.
Figure 9:
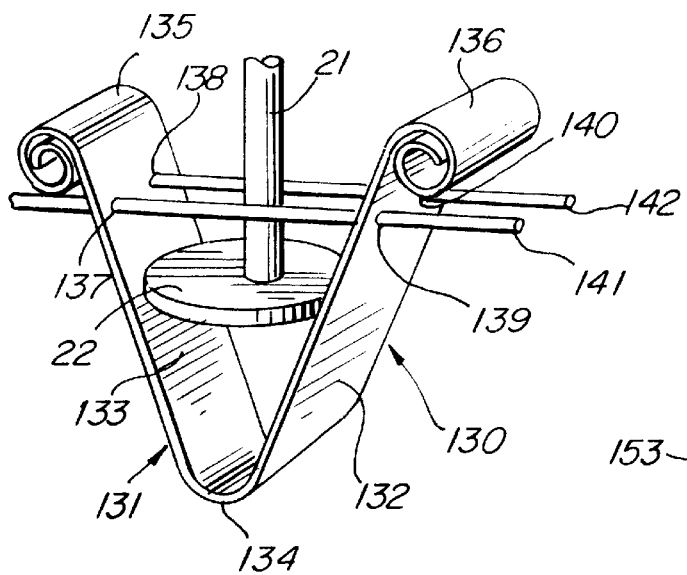
FIG. 9 sets forth a partial perspective view of a still further alternate embodiment of the present invention picker device.
Figure 10:
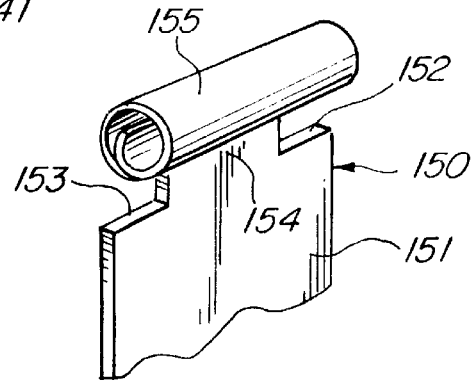
FIG. 10 sets forth a partial view of the an alternate fabrication of the embodiment of the present invention shown in FIG. 1.

It will be understood by those skilled in the art that the present invention in its preferred embodiment as shown in FIG. 1 utilizes a V-shaped spring (spring 40). This fabrication is preferable due to the low cost, simplicity and ease of fabrication for providing the expandable tapered element which performs the picking operation upon a stack of circular disks as shown in FIG. 1. However, it will be equally understood that a variety of structures may be utilized for providing the present invention picker device. The essential function of the present invention picker device is the ability of the device to expand a tapered element within the center holes of a stack of disk media material such as compact disks and thereby grip the uppermost disk alone to the exclusion of the lower disks. Toward this end, the angular or tapered structure of the picking element whether it be a V-shaped spring such as spring 40 or other embodiments such as those set forth below in greater detail function in the same basic inventive manner. The expansion creates the gripping force while the tapered or angled elements of the expandable member provides the selection of the top disk alone to the exclusion of the lower disks within the compact disk stack. Thus, as is set forth below in greater detail, alternate embodiments provide expandable jaws such as the structure of FIG. 7, individual angled spring legs such as shown in FIG. 8, as well as alternative spring supports such as shown in the embodiments of FIGS. 9 and 10. Thus, it will be understood that the present invention is not limited to a V-shaped spring in practicing the present invention structure and method.

Picker 10 further includes a motor 20 supported upon base 11 by conventional fabrication means (not shown) and having a downwardly extending output shaft 21. While not seen in FIG. 1, it will be understood that slots 12 and 13 meet at a center aperture through which shaft 21 passes. The lower end of shaft 21 supports an elliptical cam 22 having maximum dimension cam lobes 27 and 28. Shaft 21 is rotatable in response to energizing of motor 20 as indicated by arrow 26. It will be understood that rotation of shaft 21 produces a corresponding rotation of elliptical cam 22. Controller 15 is coupled to and operatively controls motor 20 via a plurality of connecting wires 16.

In the preferred fabrication of the present invention, spring 40 is formed to define a relaxed position in which legs 42 and 43 converge. Thus, in the position shown in FIG. 1 with elliptical cam 22 interposed between legs 42 and 43, the spring force of spring 40 is operative against the outer edges of elliptical cam 22 maintaining legs 42 and 43 in tension against the contacting edges of elliptical cam 22. Thus, in accordance with the operation of the present invention, the rotation of shaft 21 in response to operation of motor 20 positions elliptical cam 22 between legs 42 and 43 to control the outward spread of legs 42 and 43. With cam 22 rotated to the position shown in FIG. 1, maximal lobes 27 and 28 are positioned against the interior surfaces of legs 42 and 43 spreading legs 42 and 43 outwardly to define a relatively broad angle therebetween. Conversely, and as is better seen in FIG. 2 with cam 22 rotated approximately ninety degrees from the position shown in FIG. 1, the minimal side edges of elliptical cam 22 are positioned between legs 42 and 43. In response, the resilient spring forces of legs 42 and 43 inwardly close legs 42 and 43 against the narrow sides of elliptical cam 22 to provide a substantially narrower angle therebetween such as illustrated in solid-line representation in FIG. 2.

Of importance with respect to the operation of the present invention is the ability of picker 10 under the operative control of controller 15 to either narrow or spread legs 42 and 43 of Spring 40. By way of illustration of a typical operation, a stack of circular generally planar disk media members 30, which may for example comprise a plurality of compact disks, is positioned beneath picker 10. Stack 30 is shown in dashed-line representation to better facilitate the illustration of the structure of picker 10. In correspondence with conventional fabrication techniques, stack 30 includes a top disk 31 having a center aperture 33 and an upper surface 32. While not seen in FIG. 1, it will be understood that stack 30 being formed of a stacked plurality of disks each having center apertures the same size as aperture 33 forms a stacked array having a cylindrical passage extending downwardly from center aperture 33.

Figure 6:
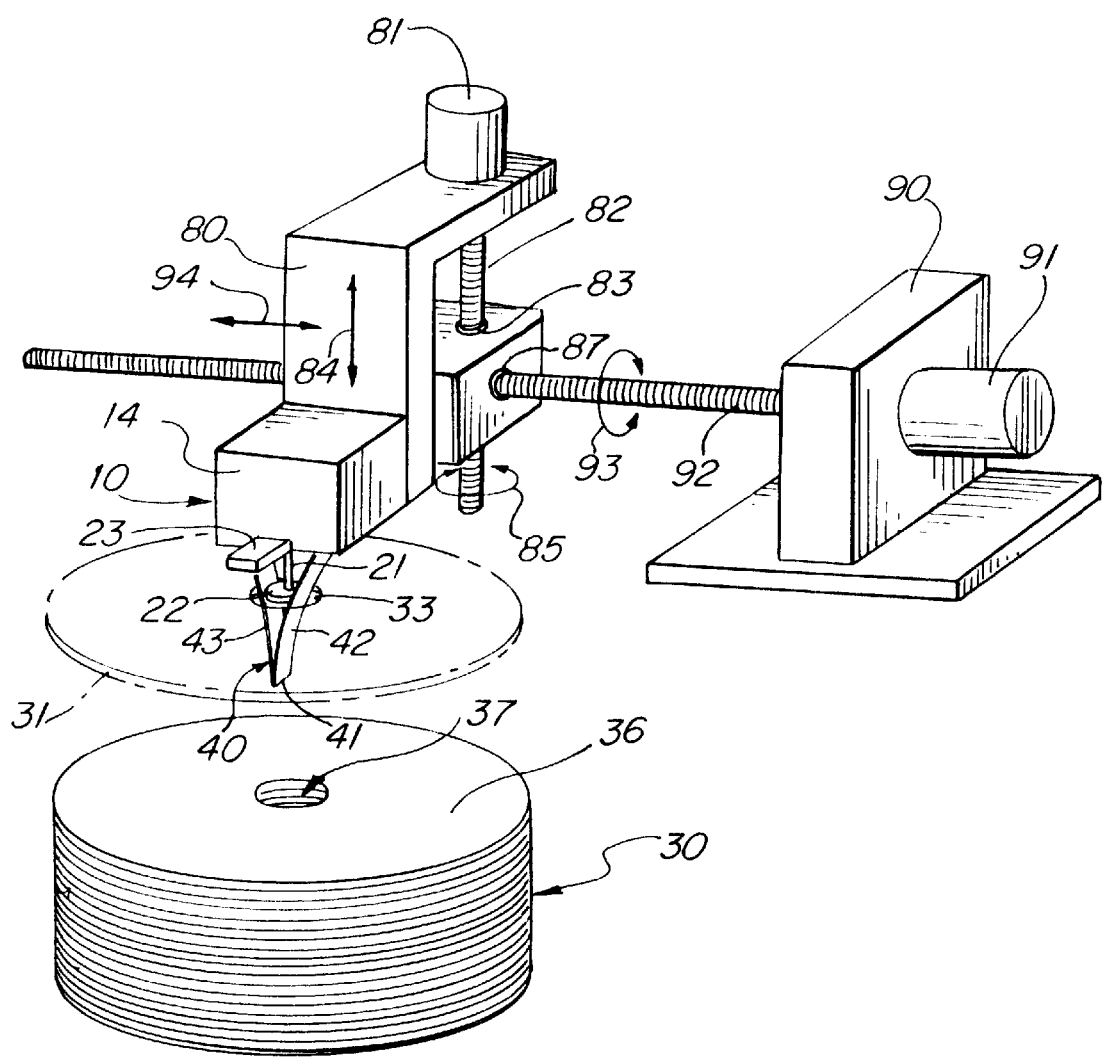
FIG. 6 sets forth a perspective view of a typical transport apparatus supporting a picker device constructed in accordance with the present invention.

In the preferred operation of the present invention, picker 10 being supported above stack 30 in a conventional manner such as that shown in FIG. 6 is initially configured having elliptical cam 22 rotated to the minimal spread of legs 42 and 43 (such as seen in FIG. 2). With legs 42 and 43 narrowed or minimally spread, picker 10 is then lowered downwardly upon stack 30 such that spring 40 extends through center aperture 33 of top disk 31 and further downwardly through the passage formed by the corresponding center apertures of underlying disks within stack 30. During the downward motion of picker 10, optical sensor 23 which includes a conventional light transmitter such as a light emitting diode and a conventional receiver such as a photo diode or photo responsive transistor operates in a conventional distance sensing fashion to transmit a light beam 24 downwardly. As light beam 24 is directed downwardly, it reflects upwardly from upper surface 32 of top disk 31 forming a reflective beam 25. In response to the intensity of reflected beam 25, sensor 23 produces an output signal utilized by controller 15 to terminate the downward movement of picker 10. It will be understood that picker 10 may be moved downwardly to extending spring 40 through center aperture 33 and beyond using conventional mechanical movements and is not dependent upon the use of an optical sensor 23. The essential function of the transport with respect to the use of the present invention is the movement of the present invention picker (picker 10) to the position shown in FIG. 1.

Once picker 10 is properly positioned with respect to stack 30, motor 20 is energized by controller 15 to rotate elliptical cam 22 such that maximal lobes 27 and 28 are moved into contact with the interior surfaces of leg 43 thereby spreading spring 40 against the interior edge of center aperture 33. This action is better seen in FIG. 2. However, suffice it to note here that the outward force of legs 42 and 43 is imparted solely to the interior edge of the topmost disk (top disk 31) in a gripping action which does not in any way engage the underlying disks within stack 30.

Thus, in accordance with an important aspect of the present invention, the spreading of spring 40 while positioned within the apertures of a disk media stack, results in engaging the interior edge of the center aperture of one single disk at the top of the media stack. This simple mechanism grips the topmost disk in this manner and avoids the use of otherwise complex devices operative to ensure that the single top disk of a stack of disks is engaged. Once elliptical cam 22 has spread legs 42 and 43 of spring 40 with sufficient force to fully engage center aperture 33, picker 10 is raised lifting top disk 31 from stack 30 and facilitating handling or transport of the single selected top disk. It will be noted that the spreading or widening as well as the narrowing movements of legs 42 and 43 of spring 40 are facilitated by the movement of neck portions 44 and 46 within slots 12 and 13 of base 11. Once picker 10 has fully engaged the selected top disk, movement of picker 10 carrying the engaged disk may be carried forward using virtually any of the presently available conventional moving or transport mechanisms of the type well known in the art.

Once picker 10 has been utilized in moving top disk 31 to the desired location, release of the disk is obtained by simply again energizing motor 20 to again rotate shaft 21 which moves maximal lobes 27 and 28 of cam 22 away from the interior surfaces of legs 42 and 43. The spring force of legs 42 and 43 causes spring 40 to narrow against the lesser dimension portions of elliptical cam 22 which in turn releases the attached disk. The disk then falls downwardly with ample clearance between center aperture 33 and legs 42 and 43. This cycle may be repeated as often as needed with each engagement being produced by inserting spring 40 into the center apertures of the disk media stack and rotating cam 22 to engage lobes 27 and 28.

FIG. 2 sets forth a partial section view of the engagement mechanism of the present invention picker device. As described above, picker 10 includes a V-shaped spring 40 having a bottom edge 41 and a pair of resilient legs 42 and 43 extending upwardly therefrom. As is set forth above in FIG. 1, the upper ends of legs 42 and 43 are slidably supported by base 11 of picker 10. As is also described above, a shaft 21 supporting an elliptical cam 22 is positioned between legs 42 and 43. The resilience of legs 42 and 43 cause spring 40 to pinch inwardly against cam 22. Thus, the spread of legs 42 and 43 is controlled by the rotational position of cam 22 upon shaft 21. Spring 40 is shown received within a passage 37 of a stack 30. Stack 30 is formed of a plurality of generally planar disk media elements such as compact disks or the like. Passage 37 is formed by the center apertures of the plurality of disks within stack 30. Thus, upper disk 31 defines an aperture 33 and, in similar fashion, the underlying disks such as disk 36 form corresponding apertures which are generally aligned to form passage 37.

In the position shown in FIG. 2, spring 40 is shown in its narrowed configuration due to the rotation of cam 22 such that the narrow portion or minor dimension of the elliptical cam is interposed between legs 42 and 43 of spring 40. In this position, spring 40 of picker 10 is lowered into stack 30 through aperture 33 of disk 31 and into passage 37. At the desired position of spring 40, shaft 21 is rotated to the spread positions shown in dashed-line representation in which maximal lobes 27 and 28 are rotated against the interior surfaces of legs 42 and 43. As cam 22 rotates, legs 42 and 43 are forced outwardly in the directions indicated by arrows 50 and 51. In the fully spread position, legs 42 and 43 are forced against and engage the interior edge of aperture 33 thereby engaging disk 31. The angular disposition of legs 42 and 43 results in a clearance between legs 42 and 43 and the interior edges of the underlying disks such as disk 36. Thus, in accordance with an important aspect of the present invention, spring 40 when spread engages the interior edge of aperture 33 of top disk 31 while avoiding engaging any underlying disks. As a result, picker 10 is able to reliably and securely engage the top disk of stack 30 alone accomplishing what is otherwise an extremely difficult and unreliable task using prior art devices.

It should be noted that the preferred fabrication of spring 40 provides a pair of elongated ribbon-like leg members which when spread outwardly within the circular apertures of the disk media produce four engagement points against the circular center apertures of the disk media.

FIG. 3 sets forth a partial section top view of the engagement of spring 40 against disk 31. As described above, disk 31 defines a circular center aperture 33 within which spring 40 is received. Also shown in FIG. 3 is shaft 21 supporting elliptical cam 22. The latter defines maximal lobes 27 and 28 which spread legs 42 and 43 of spring 40 to engage aperture 33 disk 31. As will be apparent, the cross-section of spring 40 within the plane of aperture 33 is generally rectangular resulting in the creation of four engagement points 55 through 58 between spring 40 and the interior edge of aperture 33 of disk 31. Thus, it will be appreciated that the above-described operation of spring 40 and elliptical cam 22 cooperate to provide an engagement of the disk which is to a large extent "self centering" in that minor alignment variations of disks within stack 30 (seen in FIG. 2) are readily compensated for as the topmost disk is inherently moved to a centered relationship with spring 40 as legs 42 and 43 spread outwardly during rotation of cam 22. For example, in the event disk 31 is misaligned slightly to the right in FIG. 3, the spreading of legs 42 and 43 of spring 40 causes leg 42 to engage the interior edge of aperture 33 prior to the contact of leg 43 therewith. As a result, as legs 42 and 43 continue to spread, leg 42 moves disk 31 rightwardly until leg 43 contacts the interior edge of aperture 33. Thereafter, the spreading force is uniformly applied as cam 22 rotates. A corresponding result occurs in the event disk 43 is misaligned in other directions in that the spreading of legs 42 and 43 causes an initial alignment bringing both legs into uniform contact with the center aperture of the disk.

FIG. 4 sets forth a partial section view similar to that shown in FIG. 3 illustrating the engagement of spring 40 against media having noncircular apertures. It will be understood by those skilled in the art that the present invention is not limited to media having circular center apertures. Thus, by way of example, FIG. 4 sets forth a portion of a disk 60 having an elliptical aperture 61 formed therein. The insertion of spring 40 through aperture 61 in the same manner as described above in FIGS. 1 through 3 for circular apertured disk 31 results in the creation of four engagement points 65, 66, 67 and 68 as legs 42 and 43 of spring 40 are forced outwardly using the above-described camming action or the like. By way of further example, a square aperture 62 is shown in dashed-line for disk 60 and accordingly FIG. 4 shows the engagement of legs 42 and 43 against opposed sides of the square aperture. Once again, it will be understood that the present invention picker device is operative with media having variously shaped center apertures and the circular, elliptical and square apertures shown in FIGS. 3 and 4 are provided for illustration and not for limitation.

It will be apparent to those skilled in the art that the present invention picker device may be operative utilizing a variety of mechanisms for spreading the leg portions of spring 40. That is to say, cam 22 supported upon shaft 21 in the embodiment of FIGS. 1 through 3 is provided by way of illustration. However, it will be understood that virtually any device which operates to spread the resilient leg portions of spring 40 may be utilized in place of cam 22. Accordingly, FIG. 5 sets forth an example of an alternate spreading mechanism of the present invention picker device. Thus, FIG. 5 shows a base 11 having slots 12 and 13 formed therein which slidably supports V-shaped spring 40 in the manner described above in FIG. 1. Accordingly, spring 40 includes a bottom end 41 and a pair of resilient legs 42 and 43. Leg 42 defines a narrowed neck portion 44 passing through slot 12 together with an extending larger dimension tab 45. Similarly, leg 43 defines a narrowed neck portion 46 passing through slot 13 and an extending tab 47. Thus, it will be understood that spring 40 and base 11 cooperate in substantially the same manner as set forth in FIG. 1 to slidably support resilient spring 40 to extend downwardly from base 11. In accordance with the alternate embodiment of FIG. 5, however, cam 22, shaft 21 and motor 20 (seen in FIG. 1) have been replaced with an alternative expansion mechanism which includes a plunger 70 extending downwardly through base 11 and between legs 42 and 43. Plunger 70 is supported by a movement mechanism 71 which may, for example, comprise a conventional electromagnetic solenoid or other movement mechanism. The essential function of mechanism 71 is to provide support for plunger 70 and provide movement of plunger 70 from the position shown in FIG. 5 in solid-line representation to the downwardly extending dashed-line position shown.

Thus, assuming for the moment that mechanism 71 comprises a conventional solenoid and plunger 70 is moved thereby, the activation of solenoid 71 moves plunger 70 downwardly in the direction indicated by arrow 72 to the dashed-line position shown in FIG. 5. With plunger 70 forced downwardly between legs 42 and 43, the spring force of legs 42 and 43 is overcome and spring 40 is spread outwardly to the dashed-line position shown. Thus, plunger 70 and movement mechanism 71 replace cam 22, shaft 21 and motor 20 to provide selective narrowing or spreading of spring 40 to enable the above-described picker device operation. It will be further understood by those skilled in the art that a variety of alternative apparatus may be utilized in combination with spring 40 to provide the spreading or narrowing of the V-shaped spring and operate the present invention picker device.

By way of further alternative, it will be understood that while the preferred embodiment of the present invention utilizes a V-shaped spring formed of a resilient spring steel or other similar material, virtually any resilient material such as resilient plastic or composite material may be utilized in forming spring 40 without departing from the spirit and scope of the present invention.

FIG. 6 sets forth an illustrative use of the present invention picker device for engaging the topmost disk of a disk stack and transporting it for handling packaging, sorting or other operations. It will be understood that the transport mechanism illustrated in FIG. 6 may be entirely conventional apart from the present invention picker device illustrated and described above. Thus, a variety of transport mechanisms may be employed in combination with the present invention picker device which differs substantially from the illustrative embodiment shown in FIG. 6.

More specifically, FIG. 6 sets forth a picker device 10 constructed in accordance with the present invention and described above in greater detail secured to a support frame 80. Support frame 80 includes a motor 81 supporting a rotatable shaft 82. Shaft 82 is spirally fluted or coarsely threaded and is received within an aperture 83 formed in a traveler 86. Shaft 82 is rotated in response to energizing of motor 81 in either direction as indicated by arrows 85. The threaded engagement of shaft 82 within aperture 83 facilitates raising or lowering support frame 80 in the directions indicated by arrows 84 which in turn raises or lowers picker device 10 with respect to a stack of disk media 30.

A housing 90 supports a motor 91 which in turn is coupled to an elongated shaft 92. Shaft 92 is spirally fluted or coarsely threaded and extends through an aperture 87 formed in traveler 86. The energizing of motor 91 rotates shaft 92 causing the cooperation of shaft 92 and aperture 87 to produce horizontal or lateral movement of the combination of traveler 86 and support frame 80 in the manner indicated by arrows 94. Because picker device 10 is supported upon frame 80, a corresponding horizontal or lateral motion is imparted to picker device 10 as motor 91 is energized. As mentioned above, the transport mechanism formed by housing 90, motor 91, shaft 92, traveler 86, shaft 82, motor 81 and support frame 80 may be entirely conventional in fabrication and is shown merely for purposes of illustration. The function of such a transport device is to utilize the present invention picker device in moving a selected or engaged one of the disk media elements within stack 30 during handling, packing, sorting or other operations.

In accordance with the present invention and as described above, picker device 10 includes a housing 14 supporting an optical sensor 22 and further supporting a downwardly extending V-shaped spring 40. The latter defines a bottom edge 41 and resilient legs 42 and 43. In further accordance with the above-described structure, picker device 10 includes a shaft 21 supporting an elliptical cam 22 between legs 42 and 43 of spring 40. In the position shown in FIG. 6, a disk 31 shown in dashed-line representation to facilitate fully illustrating picker device 10 is engaged upon picker device 10 by the expansion of spring 40 within aperture 33 of disk 31. Thus, with picker device 10 having engaged disk 31, the above-described transport mechanism may be operated by energizing motors 81 and 91 selectively to move disk 31 in either a lateral direction indicated by arrows 94 or vertically in directions indicated by arrows 84. Once disk 31 is positioned as desired, for example, positioned for loading into a processing station, cam 22 is rotated in the manner described above by energizing motor 20 within housing 14 (seen in FIG. 1) to narrow spring 40 and release disk 31. The process is then repeated as the transport mechanism returns picker device 10 to an aligned relationship with stack 30 and then moves picker device 10 downwardly to insert spring 40 into passage 37 formed within stack 30. The cycle is again resumed as shaft 21 is rotated which in turn rotates cam 22 and expands spring 40 to engage the next disk (disk 36) as legs 42 and 43 expand outwardly within the center aperture of disk 36. Thus, the next disk within stack 30 is engaged by picker device 10 and may be lifted therefrom by operating motor 81 and so on.

Figure 7:
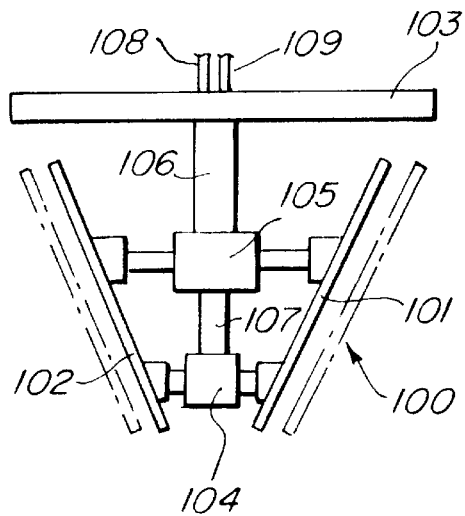
FIG. 7 sets forth a partial view of an alternate embodiment of the present invention picker device.

FIG. 7 sets forth an alternate embodiment of the present invention having a base 103 supported in the manner described above in FIG. 6 for movement in one or more directions of motion. Base 103 in turn supports a downwardly extending support 106 coupled to an expander 105 and a further support 107 coupled to an expander 104. Expanders 104 and 105 are coupled to a pair of rigid angled jaws 101 and 102. Jaws 101 and 102 may, for example, be elongated substantially rectangular members formed of a rigid material such as metal or the like. Expanders 104 and 105 are fabricated in accordance with conventional fabrication techniques such as the widely used pneumatic expanders or their equivalent. Expanders 104 and 105 are coupled by pneumatic control tubes 108 and 109 to a pneumatic control (not shown) which may be fabricated in accordance with conventional fabrication techniques.

In operation, expanders 104 and 105 operate to move jaws 101 and 102 outwardly to the expanded positions shown in dashed-line representation to accomplish the above-described picking action once jaws 101 and 102 have been positioned within the center aperture of a disk media in substantially the manner shown in FIGS. 1 and 6. Thus, the outward movement of jaws 101 and 102 engages the interior edge of the topmost disk from a stack of circular disks such as those shown in FIGS. 1 and 6 to perform the above-described engagement of the uppermost disk to the exclusion of the underlying disks and thus provide the present invention picking action.

FIG. 8 sets forth a still further alternate embodiment of the present invention in which V-spring 40 in the embodiment of FIG. 1 is replaced by a pair of spring legs 116 and 117. Legs 116 and 117 are inwardly angled to form a tapered picker and are spring-positioned in their attachment to base 111. Base 111 defines an aperture 114 and supports a motor 112 having a shaft 113 supporting an eccentric cam 115 which is substantially identical to motor 20, shaft 21 and cam 22 shown in FIG. 1.

In operation, the spring force of spring legs 116 and 117 urge legs 116 and 117 inwardly against cam 115. As cam 115 is rotated by motor 112 in the above-described manner, the eccentric lobes of cam 115 force spring legs 116 and 117 outwardly as indicated by arrows 118 and 119. In this manner, the embodiment generally referenced by numeral 110 shown in FIG. 8 operates in substantially the same manner as that described above for the embodiment shown in FIGS. 1 and 6.

FIG. 9 sets forth a partial perspective view of a still further alternate embodiment of the present invention picker device in which the generally V-shaped spring shown as spring 40 in FIG. 1 is replaced by a substantially similar spring 131 forming a tapered member having inwardly angled legs 132 and 133 and a curved bottom 134. The embodiment of FIG. 9 generally referenced by numeral 130 further departs from the embodiment described above in FIG. 1 in that tapered spring 131 is supported by a pair of rods 141 and 142 which pass through apertures 137, 138, 139 and 140 formed in tapered spring 131 to provide a sliding attachment to the supporting base such as base 11 shown in FIG. 1. In a similar manner to the structure set forth above in FIGS. 1 and 6, picker 30 further includes a shaft 21 extending downwardly between rods 141 and 142 and supporting an eccentric cam 22. While not seen in FIG. 9, it will be understood that shaft 21 is coupled to a motor such as motor 20 shown in FIG. 1 and thus is used to rotate cam 22 to spread spring 131 and perform the above-described picker action. In this spreading process, rods 141 and 142 slidably support ends 135 and 136 of spring 131.

FIG. 10 sets forth a partial perspective view of an alternative tapered spring structure which is generally similar to spring 40 shown in FIG. 1 having the sole difference being the use of curled end portions such as curled end 155. Thus, spring 150 includes a pair of end portions structured as shown in FIG. 10 which replace tabs 45 and 47 of spring 40 shown in FIG. 1. Thus, each end of spring 150 is identical and includes a leg portion 151, a pair of inwardly extending notches 152 and 153, a center support 154 and a curled end 155. It has been found that curled end 155 in some uses of the present invention picker device facilitates the sliding motion of the spring ends while supporting greater loads due to the improved bearing provided by the curved or cylindrical ends.

What has been shown is a highly effective yet simple picker device for selectively engaging the topmost one of a plurality of planar objects having center apertures formed therein. The device utilizes a simple spring mechanism together with a spreader apparatus to engage the interior edge of the center aperture of the top disk device. The picker device provided is simpler, more reliable and more cost effective than known prior art devices for accomplishing the picking function in disk media handling and processing.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A picker device for use in engaging the top disk of a stacked plurality of disks each defining a center aperture, said picker device comprising:

a base;

a generally tapered spring having upper ends slidably supported by said base and a pair of downwardly extending inwardly angled legs; and expansion means including a rotatable cam having offset lobes and means for rotating said cam supported by a said base for expanding or narrowing said tapered spring within the center apertures of a plurality of disks causing said tapered spring to engage the aperture of the top disk without engaging underlying disks.

2. The picker device set forth in claim 1 wherein said tapered spring includes a pair of resilient legs commonly joined at said bottom portion to form a bottom edge.

3. The picker device set forth in claim 2 wherein said legs are generally elongated planar rectangular metal elements.

4. The picker device set forth in claim 3 wherein said means for rotating said cam include:

a shaft having a lower end supporting said cam; and a motor coupled to said shaft for rotating said shaft.

5. The picker device set forth in claim 1 wherein said tapered spring includes a pair of resilient legs commonly joined at said bottom portion to form a bottom edge.

6. The picker device set forth in claim 5 wherein said expansion means includes:

a plunger having a lower end extending between said resilient legs; and means for moving said plunger closer to or farther from said bottom edge.

7. The picker device set forth in claim 6 wherein said legs are generally elongated planar rectangular metal elements.

8. The picker device set forth in claim 7 wherein said means for moving said plunger includes a solenoid.

9. A method of engaging the top disk of a vertical stack of disks each having a center aperture, said method comprising the steps of:

providing a vertical stack of disks;

proving an expandable pair of angled members;

moving said angled members to extend downwardly into at least some of said center apertures;

expanding said pair of members to broaden said members and engage said center aperture of said top disk by inserting an expandable member into said pair of members and causing said pair of members to expand and grip the uppermost of said disks; and raising said expanded pair of members and top disk.

10. The method set forth in claim 9 wherein said expanding step includes the step of:

inserting a noncircular cam between said pair of members; and rotating said cam.

11. A picker device for use in engaging the top disk of a stacked plurality of disks each defining a center aperture, said picker device comprising:

a base;

a generally V-shaped spring having upper ends slidably supported by said base and a pair of downwardly extending legs joined at a common bottom portion; and expansion means supported by said base for expanding or narrowing said generally V-shaped spring within the center apertures of a plurality of disks causing said V-shaped spring to engage the aperture of the top disk without engaging underlying disks.

12. The picker device set forth in claim 11 wherein said expansion means includes:

a rotatable cam having offset lobes; and means for rotating said cam.

13. The picker device set forth in claim 12 wherein said generally V-shaped spring includes a pair of resilient legs commonly joined at said bottom portion to form a bottom edge.

14. The picker device set forth in claim 13 wherein said legs are generally elongated planar rectangular metal elements.

15. The picker device set forth in claim 14 wherein said means for rotating said cam include:

a shaft having a lower end supporting said cam; and a motor coupled to said shaft for rotating said shaft.

16. The picker device set forth in claim 11 wherein said generally V-shaped spring includes a pair of resilient legs commonly joined at said bottom portion to form a bottom edge.

17. The picker device set forth in claim 16 wherein said expansion means includes:

a plunger having a lower end extending between said resilient legs; and means for moving said plunger closer to or farther from said bottom edge.

18. The picker device set forth in claim 17 wherein said legs are generally elongated planar rectangular metal elements.

19. The picker device set forth in claim 18 wherein said means for moving said plunger includes a solenoid.

20. A method of engaging the top disk of a vertical stack of disks each having a center aperture, said method comprising the steps of:

providing a vertical stack of disks;

providing an expandable V-shaped spring;

moving said spring to extend downwardly into at least some of said center apertures;

expanding said V-shaped spring to broaden said spring and engage said center aperture of said top disk by inserting an expandable member into said V-shaped spring and causing said member to expand; and raising said V-shaped spring and top disk.

21. The method set forth in claim 20 wherein said expanding step includes the step of:

inserting a noncircular cam into said V-shaped spring; and rotating said cam.

* * * * *